US009894410B2

(12) United States Patent
Norin

(10) Patent No.: US 9,894,410 B2
(45) Date of Patent: Feb. 13, 2018

(54) INTEGRATED SATELLITE-TV BROADBAND WIRELESS SYSTEM

(75) Inventor: John L. Norin, Redondo Beach, CA (US)

(73) Assignee: THE DIRECTV GROUP, INC., El Segundo, CA (US)

(*) Notice: Subject to any disclaimer, the term of this patent is extended or adjusted under 35 U.S.C. 154(b) by 320 days.

(21) Appl. No.: 12/797,570

(22) Filed: Jun. 9, 2010

(65) Prior Publication Data

US 2010/0313232 A1 Dec. 9, 2010

Related U.S. Application Data

(60) Provisional application No. 61/185,546, filed on Jun. 9, 2009.

(51) Int. Cl.
*H04N 7/20* (2006.01)
*H04N 21/4363* (2011.01)
(Continued)

(52) U.S. Cl.
CPC ...... *H04N 21/43637* (2013.01); *H04H 20/63* (2013.01); *H04H 40/90* (2013.01);
(Continued)

(58) Field of Classification Search
CPC .. H04N 21/236; H04N 21/434; H04N 21/435; H04N 21/4363; H04N 21/43637;
(Continued)

(56) References Cited

U.S. PATENT DOCUMENTS 5,283,587 A 2/1994 Hirschfield et al.
5,504,493 A 4/1996 Hirschfield
(Continued)

FOREIGN PATENT DOCUMENTS

DE 9306499 U1 7/1993
EP 1517398 A1 3/2005
(Continued)

OTHER PUBLICATIONS

Poussot, Benoit; Laheurte, Jean-Marc; Cirio, Laurent; Picon, Odile; Delcroix, David; Dussopt, Laurent; "Diversity Measurements of a Reconfigurable Antenna with Switched Polarizations and Patterns"; IEEE Transactions on Antennas and Propagation; IEEE Service Center; Piscataway, New Jersey, USA; LNKD-DOI: 10.1109/TAP. 2007.913032; vol. 56, No. 1; Jan. 1, 2008 (Jan. 1, 2008); pp. 31-38; XP011199774; ISSN: 0018-926X.
(Continued)

*Primary Examiner* — Jeremy Duffield
(74) *Attorney, Agent, or Firm* — Gates & Cooper LLP

(57) ABSTRACT

Systems and methods for combining a satellite broadcast system with a wireless system are described. The system comprises a satellite receive antenna and a wireless system device coupled thereto, the wireless system device comprising a wireless network antenna, a wireless radio system coupled to the antenna, a networking bridge coupled to the radio system, and a coaxial networking bridge for coupling a satellite signal on the satellite broadcast system with a wireless signal on the wireless network, wherein the coaxial network bridge enables a device to receive the satellite signal and the wireless signal.

17 Claims, 5 Drawing Sheets

(51) Int. Cl.
*H04N 21/633* (2011.01)
*H04H 20/63* (2008.01)
*H04H 40/90* (2008.01)
*H04N 21/436* (2011.01)
*H04N 21/61* (2011.01)

(52) U.S. Cl.
CPC ........... *H04N 7/20* (2013.01); *H04N 21/4363* (2013.01); *H04N 21/43615* (2013.01); *H04N 21/6143* (2013.01); *H04N 21/633* (2013.01)

(58) Field of Classification Search
CPC .. H04N 21/6143; H04N 21/63; H04N 21/633; H04N 21/6332
USPC .......................................... 725/63–72, 74–85
See application file for complete search history.

(56) References Cited

U.S. PATENT DOCUMENTS

| | | | |
|---|---|---|---|
| 6,040,799 | A | 3/2000 | Tachihara et al. |
| 6,600,929 | B1 | 7/2003 | Toncich et al. |
| 6,903,656 | B1 | 6/2005 | Lee |
| 7,043,280 | B1 | 5/2006 | Shields et al. |
| 7,327,983 | B2 | 2/2008 | Mehta et al. |
| 8,175,532 | B2 | 5/2012 | Nanda et al. |
| 2004/0157637 | A1 | 8/2004 | Steer et al. |
| 2005/0068915 | A1* | 3/2005 | Atad et al. .................. 370/316 |
| 2005/0097607 | A1* | 5/2005 | Kummer et al. .............. 725/58 |
| 2005/0122262 | A1 | 6/2005 | Ahn |
| 2005/0239404 | A1 | 10/2005 | Karabinis |
| 2005/0287962 | A1 | 12/2005 | Mehta et al. |
| 2006/0007932 | A1* | 1/2006 | Simyon ................... H04L 29/06 370/392 |
| 2006/0025132 | A1* | 2/2006 | Karaoguz et al. ............ 455/433 |
| 2006/0059523 | A1* | 3/2006 | Karaoguz .............. H04H 40/90 725/71 |
| 2006/0225100 | A1* | 10/2006 | James ..................... H04N 7/20 725/63 |
| 2007/0139282 | A1 | 6/2007 | Haruyama |
| 2008/0060047 | A1* | 3/2008 | Holliday et al. .............. 725/139 |
| 2008/0098212 | A1 | 4/2008 | Helms et al. |
| 2008/0285504 | A1* | 11/2008 | Lin ............................... 370/319 |
| 2008/0315596 | A1 | 12/2008 | Terry et al. |
| 2009/0113044 | A1* | 4/2009 | Lancaster et al. ............ 709/224 |
| 2010/0269146 | A1 | 10/2010 | Britt |
| 2012/0242495 | A1 | 9/2012 | Aguirre et al. |
| 2012/0264367 | A1 | 10/2012 | Aguirre et al. |
| 2012/0291104 | A1 | 11/2012 | Hasek |

FOREIGN PATENT DOCUMENTS

| | | |
|---|---|---|
| WO | 2005025100 A2 | 3/2005 |
| WO | 2005062419 A1 | 7/2005 |
| WO | 2009013297 A1 | 1/2009 |

OTHER PUBLICATIONS

Hamaguchi, Kiyoshi; Shoji, Yozo; Ogawa, Hiroyo; Sato, Hiroya; Tokuda, Kiyohito; Hirachi, Yasutake; Iwasaki, Toshiya; Akeyama, Akira; Ueki, Katsuhiko; Kizawa, Takao; "A Wireless Video Homelink Using 60GHz Band: Concept and Performance of the Developed System"; 30th European Microwave Conference Proceedings; Paris, France; Oct. 3-5, 2000; [Proceedings of the European Microwave Conference]; London: CMP, GB; vol. Conf. 30; Oct. 3, 2000 (Oct. 3, 2000); pp. 293-296; XP001060751.

International Search Report and Written Opinion dated Sep. 23, 2010 in International Application No. PCT/US2010/038035 filed Jun. 9, 2010 by John L. Norin.

Final Rejection dated Apr. 9, 2013 in U.S. Appl. No. 12/797,412, filed Jun. 9, 2010 by John L. Norin.

Non-final Office action dated Oct. 17, 2012 in U.S. Appl. No. 12/797,412, filed Jun. 9, 2010 by John L. Norin.

Notice of Allowance dated Jun. 20, 2013 in U.S. Appl. No. 12/797,412, filed Jun. 9, 2010 by John L. Norin.

Non-final Office action dated Dec. 24, 2014 in U.S. Appl. No. 13/923,996, filed Jun. 21, 2013 by John L. Norin et al.

International Search Report and Written Opinion dated Oct. 20, 2014 in International Application No. PCT/US2014/042551 filed Jun. 16, 2014 by John L. Norin et al.

Notice of Allowance dated Jun. 3, 2015 in U.S. Appl. No. 13/923,996, filed Jun. 21, 2013 by John L. Norin et al.

\* cited by examiner

INTEGRATED SATELLITE-TV BROADBAND WIRELESS SYSTEM

CROSS-REFERENCE TO RELATED APPLICATIONS

This application claims the benefit of 35 U.S.C. § 119(e) of U.S. Application Ser. No. 61/185,546, filed on Jun. 9, 2009, by John L. Norin, entitled "INTEGRATED SATELLITE-TV BROADBAND WIRELESS SYSTEM," which application is incorporated by reference herein.

This application is related to U.S. application Ser. No. 12/797,412, filed on Jun. 10, 2010, by John L. Norin, entitled "OMNIDIRECTIONAL SWITCHABLE BROADBAND WIRELESS ANTENNA SYSTEM," which application is incorporated by reference herein.

BACKGROUND OF THE INVENTION

1. Field of the Invention

The present invention relates generally to satellite video systems, and in particular, to a method and apparatus for integrating a satellite television system and a wireless broadband system

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight Integrated Receiver Decoders (IRDs) on separate cables from a multiswitch.

FIG. 1 illustrates a typical satellite broadcast system of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to the home, users will like and expect these additional services to be delivered at reasonable cost. Viewers and users of services, e.g., wireless networking, interne services, etc., will like and expect to have access to these services and integrate these services with other services, e.g., wireless telephone communications, etc.

FIG. 2 illustrates a typical ODU of the related art.

ODU 108 typically uses reflector dish 123 and feedhorn assembly 124 to receive and direct downlink signals 120 onto feedhorn assembly 124. Reflector dish 122 and feedhorn assembly 124 are typically mounted on bracket 126 and attached to a structure for stable mounting. Feedhorn assembly 124 typically comprises one or more Low Noise Block converters 128, which are connected via wires or coaxial cables to a multiswitch, which can be located within feedhorn assembly 124, elsewhere on the ODU 108, or within house 110. LNBs typically downconvert the FSS-band, Ku-band, and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables. ODU 108 is typically mounted to home 110 via a mast 130 or other assembly which enables alignment of dish 123 with the various satellites 102-106.

The multiswitch enables system 100 to selectively switch the signals from SatA 102, SatB 104, and SatC 106, and deliver these signals via cables 124 to each of the IRDs 112A-D located within house 110. Typically, the multiswitch is a five-input, four-output (5×4) multiswitch, where two inputs to the multiswitch are from SatA 102, one input to the multiswitch is from SatB 104, and one input to the multiswitch is a combined input from SatB 104 and SatC 106. There can be other inputs for other purposes, e.g., off-air or other antenna inputs, without departing from the scope of the present invention. The multiswitch can be other sizes, such as a 6×8 multiswitch, if desired. SatB 104 typically delivers local programming to specified geographic areas, but can also deliver other programming as desired.

To maximize the available bandwidth in the Ku-band of downlink signals 120, each broadcast frequency is further divided into polarizations. Each LNB 128 can only receive one polarization at time, so by aligning polarizations between the downlink polarization and the LNB 128 polarization, downlink signals 120 can be selectively filtered out from travelling through the system 100 to each IRD 112A-D.

IRDs 112A-D currently use a one-way communications system to control the multiswitch. Each IRD 112A-D has a dedicated cable 124 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multiswitch, and the multiswitch delivers the SatA 102 signal to IRD 112A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13VDC without the 22 kHz tone would select one port, 13VDC with the 22 kHz tone would select another port of the multiswitch, etc. There can also be a modulated tone, typically a 22 kHz tone, where the modulation schema can select one of any number of inputs based on the modulation scheme.

To reduce the cost of the ODU 108, outputs of the LNBs 128 present in the ODU 108 can be combined, or "stacked,"

depending on the ODU 108 design. The stacking of the LNB 128 outputs occurs after the LNB has received and down-converted the input signal. This allows for multiple polarizations, one from each satellite 102-106, to pass through each LNB 128. So one LNB 128 can, for example, receive the Left Hand Circular Polarization (LHCP) signals from SatC 102 and SatB 104, while another LNB receives the Right Hand Circular Polarization (RHCP) signals from SatB 104, which allows for fewer wires or cables between the LNBs 128 and the multiswitch.

The Ka-band of downlink signals 120 will be further divided into two bands, an upper band of frequencies called the "A" band and a lower band of frequencies called the "B" band. Once satellites are deployed within system 100 to broadcast these frequencies, each LNB 128 can deliver the signals from the Ku-band, the A band Ka-band, and the B band Ka-band signals for a given polarization to the multiswitch. However, current IRD 112 and system 100 designs cannot tune across this entire frequency band, which limits the usefulness of this stacking feature.

By stacking the LNB 128 inputs as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data. However, as mentioned above, current IRDs 112 cannot use the information in some of the proposed frequencies used for downlink signals 120, thus limiting the information transmitted in those downlink signals 120.

In addition, all inputs to the multiswitch are utilized by the current satellite 102-106 configuration, which inhibits upgrades to the system 100 for additional satellite downlink signals 120 to be processed by the IRD 112. Further, adding another IRD 112 to a house 110 requires a cabling run back to the ODU 108. Such limitations on the related art make it difficult and expensive to add new features, such as additional channels, high-definition programming, additional satellite delivery systems, etc., or to add new IRD 112 units to a given house 110.

Even if additional multiswitches are added, the related art does not take into account cabling that may already be present within house 110, or the cost of installation of such multiswitches given the number of ODU 108 and IRD 112 units that have already been installed. Although many houses 110 have coaxial cable routed through the walls, or in attics and crawl spaces, for delivery of audio and video signals to various rooms of house 110, such cabling is not used by system 100 in the current installation process.

FIG. 3 illustrates a single wire multiswitch embodiment of a satellite broadcast system of the related art.

ODU 108 can also be coupled to Frequency Translation Module (FTM) 500, also known as a Single Wire Multiswitch (SWiM) 500. SWiM 500 is coupled to power injector 502. SWiM 500 is able to directly support currently installed IRD 112 directly as shown via cables 124, as described with respect to FIGS. 1 and 2.

The SWiM 500 is also able to support new IRDs 508, via a network of signal splitters 504 and 506, and power injector 502. New IRDs 508 are able to perform two-way communication with SWiM 500, which assists IRDs 508 in the delivery of custom signals on private IRD selected channels via a single cable 510. Each of the splitters 504 and 506 can, in some installations, have intelligence in allowing messages to be sent from each IRD 508 to SWiM 500, and back from SWiM 500 to IRDs 508, where the intelligent or smart signal splitters 504 and 506 control access to the SWiM 500.

The two-way communication between IRDs 508 and SWiM 500 can take place via cable 510, or via other wiring, such as power distribution lines or phone lines that are present within house 110.

It can be seen, then, that there is a need in the art for a satellite broadcast system that can be expanded. It can also be seen that there is a need in the art for a satellite broadcast system that utilizes pre-existing household cabling to minimize cost and increase flexibility in arrangement of the system components.

SUMMARY OF THE INVENTION

To minimize the limitations in the prior art, and to minimize other limitations that will become apparent upon reading and understanding the present specification, the present invention comprises systems and methods for combining a satellite broadcast system with a wireless system. A system in accordance with one or more embodiments of the present invention comprises a satellite receive antenna, and a wireless system device, coupled to the satellite receive antenna, the wireless system device comprising a wireless network antenna, a wireless radio system, coupled to the antenna, a networking bridge, coupled to the radio system, and a coaxial networking bridge, for coupling a satellite signal on the satellite broadcast system with a wireless signal on the wireless network, wherein the coaxial network bridge enables a device to receive the satellite signal and the wireless signal.

Such a system further optionally comprises the wireless system device being mounted external to a structure, the wireless system device being mounted with the satellite receive antenna, the wireless system device being controlled via the wireless network, the wireless system device being a relay device for at least one wireless device, the wireless system device providing a two-way communications path, the wireless system device providing a higher signal throughput as compared to a wireless system lacking the wireless system device, and the higher signal throughput being provided by an increase in wireless system signal strength, a change in coding schema, and/or additional gain in the wireless system antenna.

A wireless device for increasing capacity of a wireless network in accordance with one or more embodiments of the present invention comprises a wireless network antenna, a wireless radio system, coupled to the antenna, and a networking bridge, coupled to the radio system, the networking bridge enabling a higher efficiency modulation schema than a modulation schema used on the wireless network, wherein the wireless device is installed external to a structure and provides an access point to the wireless network for at least one device internal to the structure.

Such a device further optionally comprises a coaxial networking bridge for coupling a satellite signal on a satellite broadcast system with a wireless signal on the wireless network, wherein the coaxial network bridge enables the device to receive the satellite signal and the wireless signal, the wireless system device being mounted with a satellite receive antenna, the wireless system device being controlled via the wireless network. the wireless device being a relay device for at least one additional wireless device, and the increased capacity being provided by an increase in wireless system signal strength, a change in modulation schema, and/or additional gain in the wireless network antenna.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
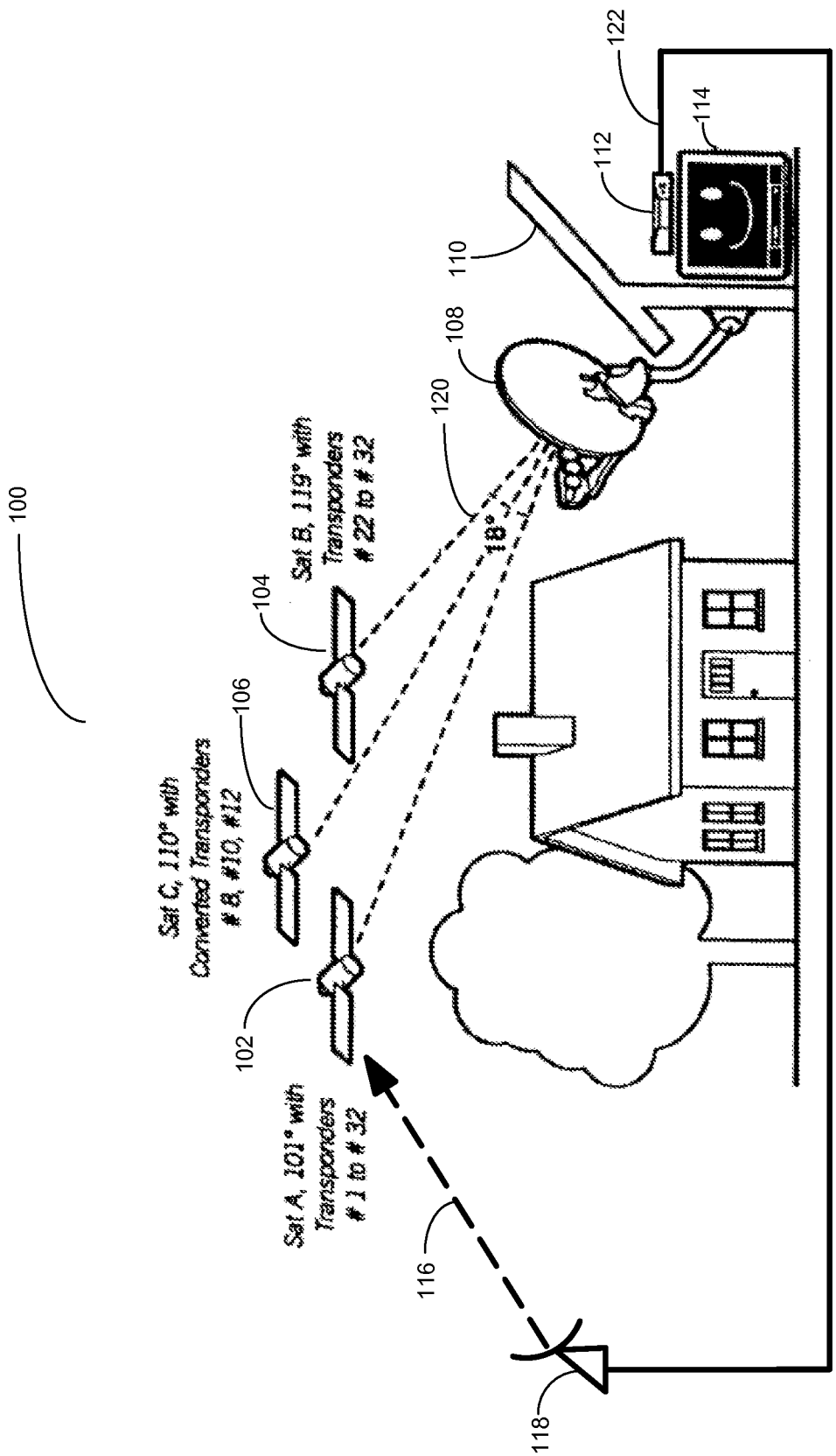
FIG. 1 illustrates a typical satellite broadcast system of the related art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention enables a satellite broadcast system (e.g., DIRECTV) consumer's home to be efficiently served with a broadband interne connection utilizing an arbitrary wireless network. For example, the wireless network may be "4G" capable, providing broadband service competitive with DSL and Cable Modem based systems. Both the 3GPP Long Term Evolution (LTE) and 802.16 based WiMax technologies meet this 4G requirement.

To date, wireless carriers have not actively competed against fixed DSL and Cable Modem services due to the lack of capacity on the wireless network. The lack of capacity arises from various sources, including the available wireless channel bandwidth, the indoor nature of wireless devices such as cell phones, the low gain antennas on such devices, and the inherent nature of the targeted wireless business opportunity. The present invention changes these dynamics.

One or more embodiments of the present invention comprise a combination of an outdoor mounted device and one or more indoor devices. The outdoor mounted device may include, for example, 1) a 4G wireless modem, 2) an associated wireless antenna system, 3) a coax networking technology such as Multimedia over Coax Alliance (MoCA), and 4) appropriate management/control/networking functionality. The indoor devices may comprise either 1) coax networked satellite set top boxes with or without the use of coax networking adapters, or 2) other coax network enabled devices such as network routers, switches, wireless access points, or other devices commonly found in home network systems.

Although one embodiment of the solution is in a single integrated housing, it is possible to design the solution to allow for a remotely detachable antenna for location at a more optimal location. It is also possible to embed some of the functionality in a companion device located indoors, which would provide the traditional router functions, e.g. network address translation (NAT), firewall, DHCP address server functions, etc. In one embodiment, there is at least an optional indoor device that can provide wireless access point service and/or Ethernet switch/hub functionality.

Embodiments of the present invention may optionally incorporate relay/repeater functionality. An example of this is the 802.16j implementation of a WiMax relay node. Other examples could include an LTE relay/repeater or a WiFi repeater to service devices in the local neighborhood.

One or more embodiments of the present invention enable far superior efficiency on the wireless network by improving the link budget through the following means:

eliminating the indoor penetration loss which is typically 10-15 dB, increasing the user device antenna gain by approximately 10 dB, and elevating the device by several meters resulting in lower propagation losses by 5-10 dB decreasing interference from adjacent cell sites resulting in a lower interference environment The improved link budget allows for operation with a higher order modulation format (e.g. 64 QAM instead of QPSK), thereby allowing for higher connection speeds and/or less time resource required on the wireless network to achieve the desired user connection speed. This leads to higher efficiency of the wireless network, helping to facilitate residential fixed broadband service over a wireless network.

Single Wire Multiswitch (SWiM) enabled homes will be able to most readily take advantage of this invention.

System Diagram

Figure 4:
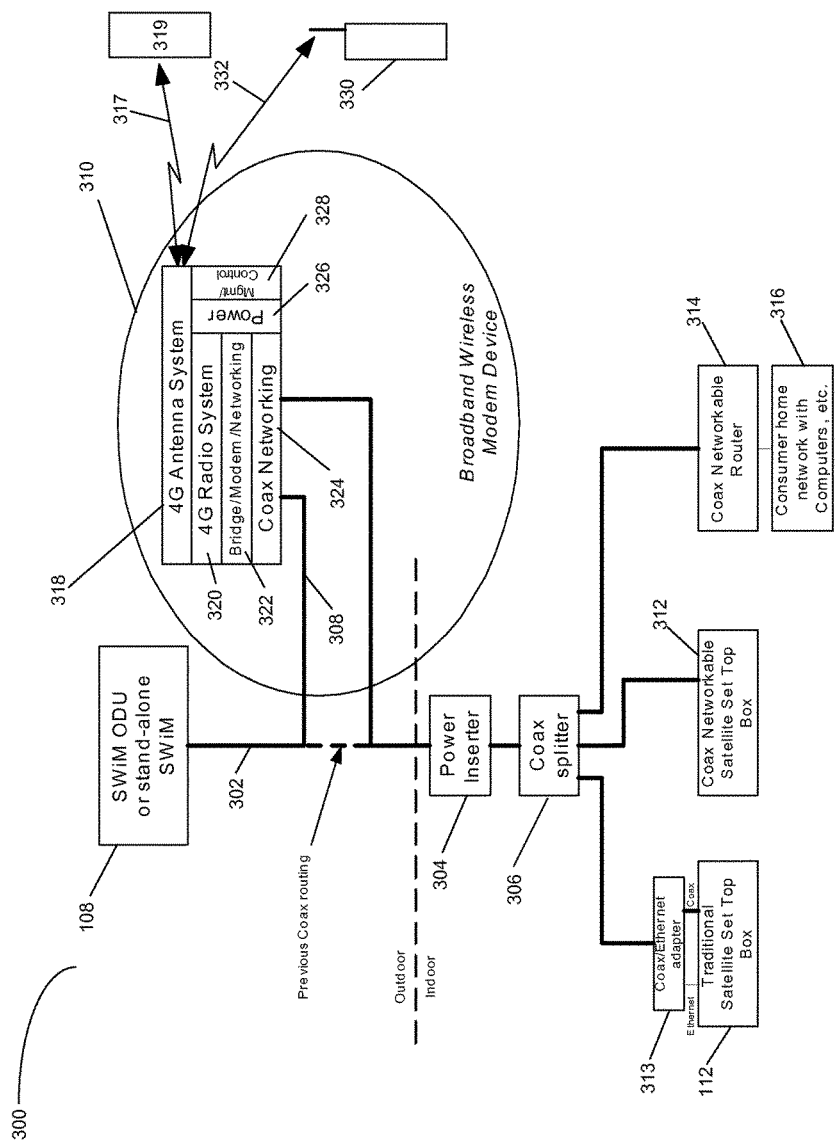
FIG. 4 illustrates a system diagram of one or more embodiments of the present invention.

FIG. 4 illustrates a system diagram in accordance with one or more embodiments of the present invention.

Figure 2:
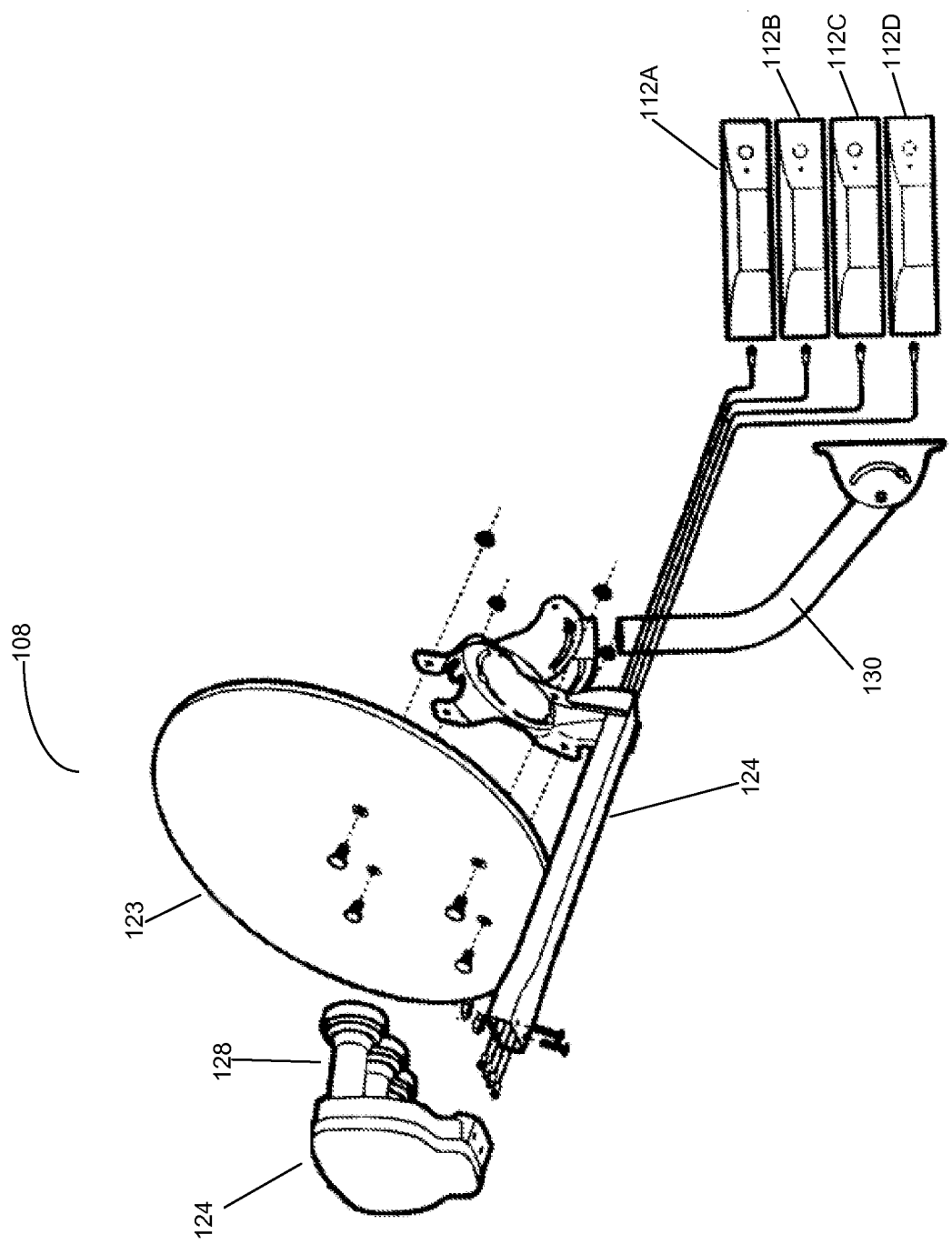
FIG. 2 illustrates a typical ODU of the related art.
Figure 3:
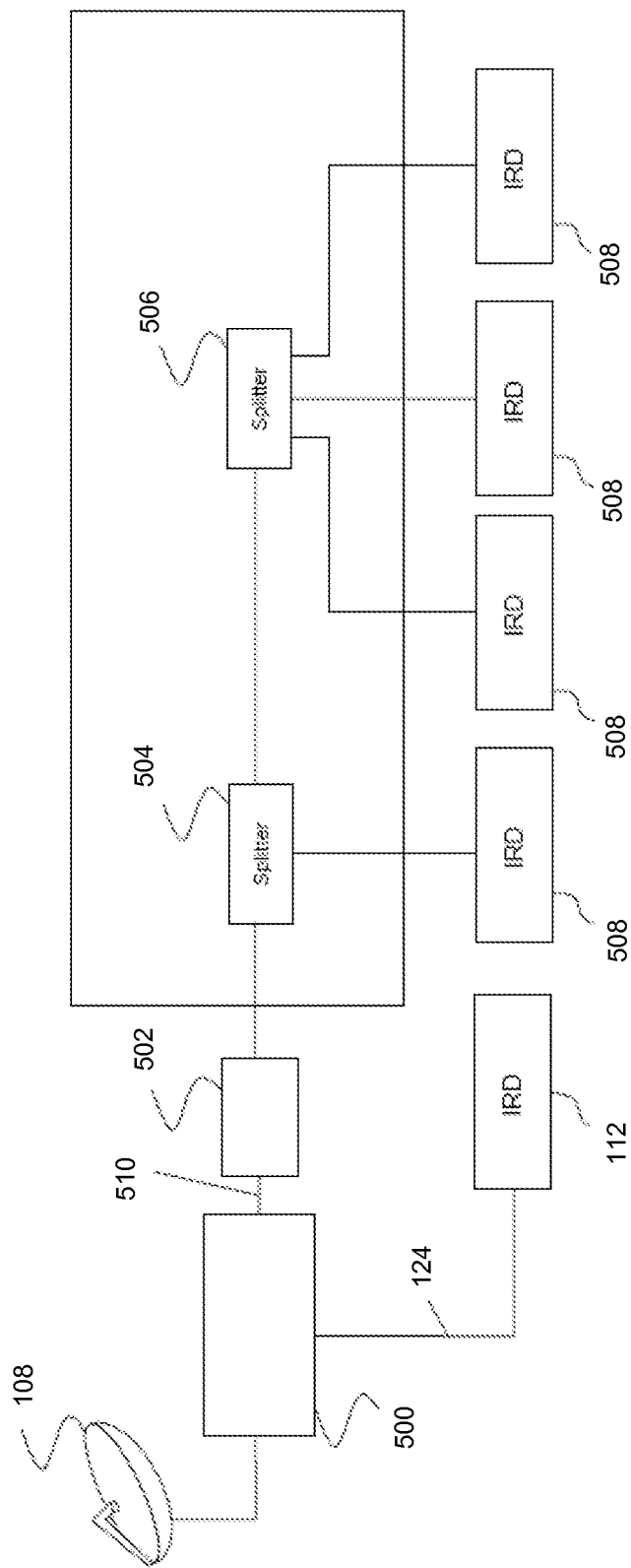
FIG. 3 illustrates a single wire multiswitch embodiment of a satellite broadcast system of the related art.

System 300 illustrates the ODU 108, which can be an ODU 108 as shown in FIG. 2 combined with a SWiM module allowing for a single-cable approach to satellite signal distribution as shown in FIG. 3, or, alternatively, a multiple dedicated cables 124 approach shown in FIG. 2. In a SWiM system, cable 302 is routed to a power inserter 304, and then to a coaxial signal splitter 306 for signal delivery of the signal on cable 302 to one or more IRDs 112 as desired directly from splitter 306.

In accordance with one or more embodiments of the present invention, cable 302 is routed via path 308 to a broadband capable device 310 that is mounted outside the home 110. Typically, broadband device 310 can be mounted along with ODU 108, e.g., on the mast 130, or elsewhere on ODU 108, or separate from ODU 108 as desired or depending on the packaging of broadband device 310. Further, broadband device 310 can stand alone if desired.

Broadband device 310 enables additional devices 312 and 314 to operate in conjunction with the satellite system 100. For example, an IRD 312 that is networkable via coaxial cable is broadband-enabled using the broadband device 310, and a network router 314 may be coupled to the satellite delivery system 100 for delivery of satellite and internet signals to a computer 316 or other devices as desired.

External Broadband Device

Within broadband device 310, several components enable the services and delivery of signals. Initially, antenna system 318 is used to enable two-way communication 317 with at least one wireless network 319, e.g., the Verizon LTE network, the Sprint network, the AT&T network, etc. Antenna system 318 can be of any design, e.g., omnidirectional, phased array, etc., that will enable communications with such networks.

A radio system 320, that is compatible with the antenna system 318, and enables the coding and frequency generation compatible with the wireless network(s) 319, is also present in broadband device 310. Such a radio system 320 can be designed to be compatible with a single wireless network 319, or with multiple wireless networks 319, as desired.

To couple the wireless network(s) 319 to the satellite signals, a bridge/modem/networking system 322 is used to couple the wireless network 319 with the satellite system 100. Such a system 322 may comprise a bridge or combiner to couple the two signals (wireless and satellite) together at specific frequencies, coding schemes, etc., and to translate these signals into signals that can be used by the various devices 112, 312, and 314 (and other devices as desired). Further, system 322 allows for networking of these signals, as well as a modem to modulate and demodulate the signals into desired or predetermined modulation schema for use by the various devices 112, 312, and 314 (and other devices as desired). In one embodiment, an adapter 313 can be inserted between IRD 112 and splitter 306 to enable IRD 112 to communicate through the new network.

Various network architectures and functions within the system 322 are possible, e.g., routers, firewalls, Dynamic Host Configuration Protocol (DHCP), Network Address Translation (NAT) functions, etc. Although discussed herein as a generic system 322, system 322 encompasses capabilities to combine any wireless network 319 implementation with a local antenna/delivery system 200.

A further element of the wireless device 310 networks the satellite and wireless signals onto a coaxial network, shown as coax networking system 324. Finally, a power source 326 and management/control system 328 are shown. System 328 is a controller for the wireless portion of the system 300, however, commands from the satellite system 100, either via ODU 109 or devices 112 and 312, can be sent and interpreted by the control system 328 as desired. Control of the broadband device 310 can also be dedicated to the wireless system 319 if desired. Power source 326 can be a standalone source, or can derive power from the power inserter or from the IRD 112 as in a typical system 100.

The antenna system 318 also enables the use of broadband device 310 as a relay port to communicate with handheld devices 330 via a local wireless communications path 332. Thus, if handheld device 330 cannot receive enough signal strength from wireless network 319, broadband device 310 can act as a repeater or relay to connect handheld device 330 to wireless network 319 via path 332. Such a path 332 can be controlled by wireless network 319 or via control of the broadband device 310 through user control, or via satellite system 100, as desired.

Figure 5:
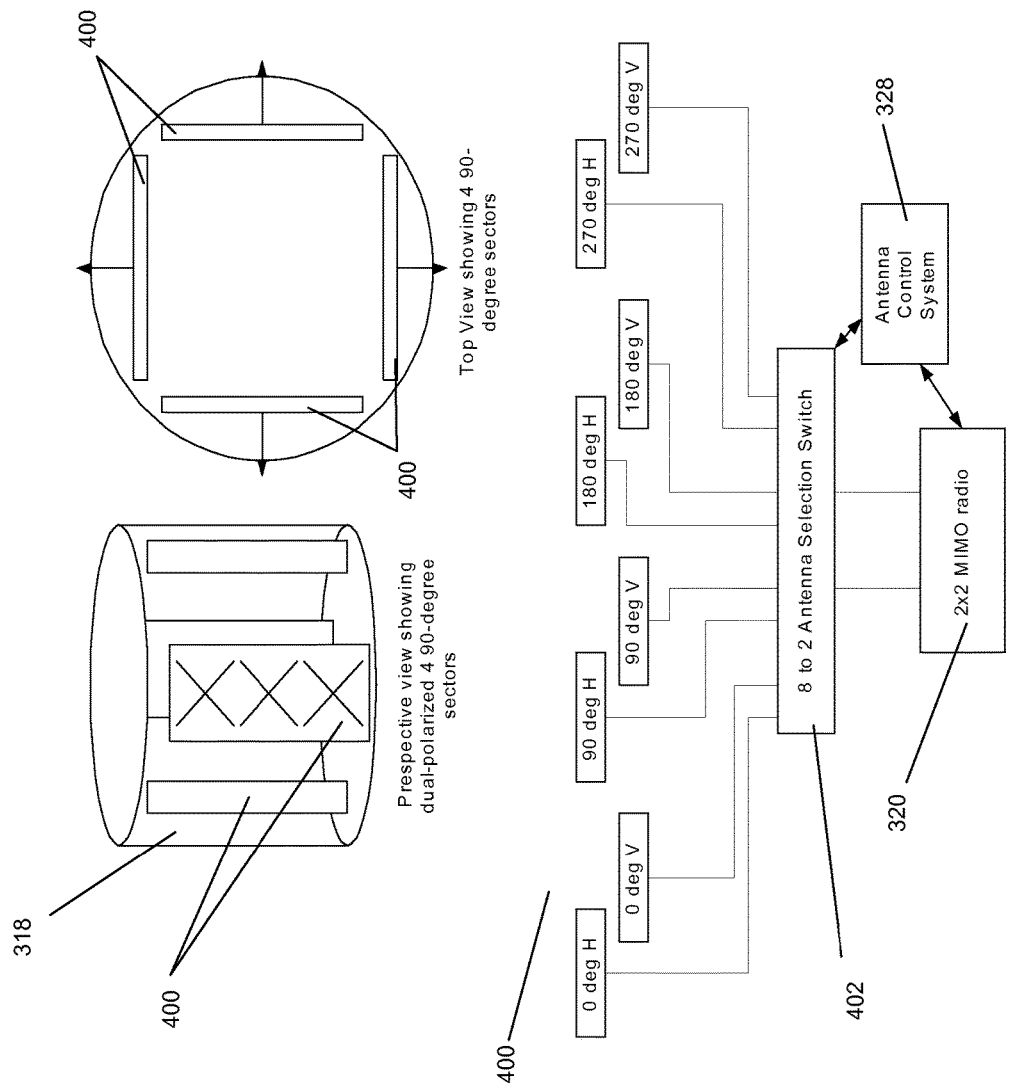
FIG. 5 illustrates an embodiment of an antenna system in accordance with one or more embodiments of the present invention.

FIG. 5 illustrates an embodiment of an antenna system in accordance with one or more embodiments of the present invention.

Antenna system 318 is shown as a multiple element antenna, with elements 400 comprising horizontal and vertical polarization receive/transmit elements. Elements 400 are arranged in approximately 90 degree sectors, such that each of the elements 400 covers an approximately 90 degree field of view. Antenna elements 400 can also be arranged to receive arbitrarily polarized signals, or signals with circular polarizations, slant cross-polarizations, or other types of polarizations used for signal transmission and reception, without departing from the scope of the present invention. Elements 400 are typically arranged in approximately 90 degree sectors, such that each of the elements 400 covers an approximately 90 degree field of view, although other arrangements of elements 400 are possible within the scope of the present invention.

Antenna control system 328 determines signal strength received at each of the elements 400, and determines which one or ones of the elements 400 should be energized, and in which phases the elements should be energized, or, alternatively or collectively, which elements 400 should be used to allow antenna system 318 to best communicate with wireless network 319. As part of radio system 320, Multiple-Input-Multiple-Output (MIMO) radio allows for multiple antennas to be input to radio system 320, and antenna switch 402 allows combination of the elements 400 such that radio system 320 can properly interpret such communications, and such that control system 328 can properly control elements 400. A larger or smaller number of elements 400 can be used without departing from the scope of the present invention. Further, other antenna systems 318 can be used without departing from the scope of the present invention.

Antenna beams from antenna system 318 can be formed with single antenna elements 400, or by combining a plurality of individual elements 400 to create a new antenna beam from combining two or more elements 400. A typical solution in accordance with the present invention uses four elements 400 per polarization to create eight antenna 318 beams per polarization by using the individual antenna 318 beams, and by combining each pair of two adjacent antenna 318 beams, but other beam patterns, element 400 combinations, or communications paths with antenna 318 are possible within the scope of the present invention.

Although described with respect to 90 degree sector elements 400, any number of elements 400 can be used with an antenna 300 within the scope of the present invention. For example, and not by way of limitation, there can be twenty elements 400: ten elements 400 for horizontal polarization and ten elements 400 for vertical polarization, where each element is arranged in an approximately 36 degree sector. Corresponding changes would then be made to antenna selection switch 402 and antenna control system 328 to properly configure such an antenna 300 with additional or fewer elements 400.

Because the antenna control system 328 can determine signal characteristics received at any or all of the elements 400, the antenna 300 can be electrically oriented for signal reception in a variety of directions upon installation of antenna 300 at a given spatial orientation. Thus, antenna 300 can be pointed in any direction, rather than point antenna 300 in a particular direction to receive signals from system 100, which would require a more complicated installation procedure for antenna 300.

Such installation freedom renders the antenna 300 as "omnidirectional" in terms of installation, but directional in terms of usage because of the control provided by antenna control system 328. So for example, and not by way of limitation, since antenna control system 328 can determine which of the element(s) 400 are receiving signals, and, through computation, which direction the signals are coming from, the zero degree horizontal and zero degree vertical elements 400 are not required to point directly or even approximately at the source of the signals. Instead, the antenna control system 328 can energize and/or de-energize elements 400 to allow antenna 300 to receive the signal at as high a signal strength as possible by configuring the phase and/or energization of the individual elements 400 to match the incoming signal characteristics.

Further, antenna 300 can be re-configured should signal conditions change. For example, and not by way of limitation, system 100 can place additional cells 108, with corresponding additional BTS 106 antennas, which may change the direction and/or strength of signals being received by antenna 300. As such, periodically or continuously, control system 328 can evaluate the signals being received by antenna 300 and adjust the energization of elements 400 to allow for increased bit rates, signal strength, or other desired signal characteristic based on monitoring of the signals being received by antenna 300 and making corresponding changes to the elements 400 via control system 328. No physical re-alignment of antenna 300 would typically be required, because control system 328 reconfigures antenna 300 electronically to "point" at the signal source.

Antenna control system 328 can also communicate with radio 330 (which can be a cellular telephone, PDA, or other device), which accesses either wireless network 319, or provides access to other networks or other devices as desired. Radio 330 can be mobile, or fixed in location. Antenna control system 328 can use feedback from radio 330 to determine how to energize antenna elements 400, such that radio 330 can maintain communications with system 319 through antenna 300.

Conclusion

The present invention comprises systems and methods for combining a satellite broadcast system with a wireless system. A system in accordance with one or more embodiments of the present invention comprises a satellite receive antenna, and a wireless system device, coupled to the satellite receive antenna, the wireless system device comprising a wireless network antenna, a wireless radio system, coupled to the antenna, a networking bridge, coupled to the radio system, and a coaxial networking bridge, for coupling a satellite signal on the satellite broadcast system with a wireless signal on the wireless network, wherein the coaxial network bridge enables a device to receive the satellite signal and the wireless signal.

Such a system further optionally comprises the wireless system device being mounted external to a structure, the wireless system device being mounted with the satellite receive antenna, the wireless system device being controlled via the wireless network, the wireless system device being a relay device for at least one wireless device, the wireless system device providing a two-way communications path, the wireless system device providing a higher signal throughput as compared to a wireless system lacking the wireless system device, and the higher signal throughput being provided by an increase in wireless system signal strength, a change in coding schema, and/or additional gain in the wireless system antenna.

A wireless device for increasing capacity of a wireless network in accordance with one or more embodiments of the present invention comprises a wireless network antenna, a wireless radio system, coupled to the antenna, and a networking bridge, coupled to the radio system, the networking bridge enabling a higher efficiency modulation schema than a modulation schema used on the wireless network, wherein the wireless device is installed external to a structure and provides an access point to the wireless network for at least one device internal to the structure.

Such a device further optionally comprises a coaxial networking bridge for coupling a satellite signal on a satellite broadcast system with a wireless signal on the wireless network, wherein the coaxial network bridge enables the device to receive the satellite signal and the wireless signal, the wireless system device being mounted with a satellite receive antenna, the wireless system device being controlled via the wireless network, the wireless device being a relay device for at least one additional wireless device, and the increased capacity being provided by an increase in wireless system signal strength, a change in modulation schema, and/or additional gain in the wireless network antenna.

The foregoing description has been presented for the purposes of illustration and description. It is not intended to be exhaustive or to limit the invention to the precise form disclosed. Many modifications and variations are possible in light of the above teaching. It is intended that the scope of the invention not be limited by this detailed description.

What is claimed is:

1. A system for combining a satellite broadcast system with a wireless network, comprising:
 a satellite receive antenna that only receives a satellite broadcast signal comprised of both television programming and commands from the satellite broadcast system, wherein the satellite receive antenna is coupled to a single wire multiswitch and the satellite broadcast signal comprised of television programming is sent by the single wire multiswitch to at least one integrated receive decoder, and the integrated receive decoder decodes and separates the satellite broadcast signal comprised of television programming into viewer channels, which are then passed to a monitor for viewing by a user; and
 a wireless system device, separate from the integrated receive decoder and also coupled to the single wire multiswitch, that both transmits and receives a wireless broadband signal to or from the wireless network using a wireless network antenna, the wireless system device comprising:
  a wireless radio system, coupled to the wireless network antenna,
  a networking bridge, coupled to the wireless radio system;
  a coaxial networking bridge, for coupling the satellite broadcast signal received by the satellite receive antenna from the satellite broadcast system with the wireless broadband signal received by the wireless network antenna from the wireless network; and
  a controller for the wireless system device for controlling other elements of the wireless system device;
  wherein the coaxial network bridge enables the wireless system device to receive both the satellite broadcast signal and the wireless broadband signal; and
  wherein the coaxial network bridge enables the satellite broadcast system to send the satellite broadcast signal comprised of the commands to the wireless system device that are interpreted by the controller for the wireless system device, and the controller controls the wireless network antenna of the wireless system device based on the commands.

2. The system of claim 1, wherein the wireless system device is mounted external to a structure.

3. The system of claim 1, wherein the wireless system device is mounted with the satellite receive antenna.

4. The system of claim 1, wherein the wireless system device is controlled via the wireless network.

5. The system of claim 1, wherein the wireless system device is a relay device for at least one wireless device.

6. The system of claim 1, wherein the wireless system device provides a two-way communications path.

7. The system of claim 1, wherein the wireless system device provides a higher signal throughput as compared to a wireless system lacking the wireless system device.

8. The system of claim 7, wherein the higher signal throughput is provided by an increase in wireless system signal strength.

9. The system of claim 8, wherein the higher signal throughput is provided by a change in coding schema.

10. The system of claim 7, wherein the higher signal throughput is provided by additional gain in the wireless system antenna.

11. A wireless device for increasing capacity of a wireless network, comprising:
- a wireless network antenna;
- a wireless radio system, coupled to the wireless network antenna;
- a networking bridge, coupled to the wireless radio system, the networking bridge enabling a higher efficiency modulation schema than a modulation schema used on the wireless network, wherein the wireless device is installed external to a structure and provides an access point to the wireless network for at least one device internal to the structure; and
- a coaxial networking bridge, for coupling a satellite broadcast signal received by a satellite receive antenna from a satellite broadcast system with a wireless broadband signal for bidirectional communication transmitted or received on the wireless network using the wireless network antenna, wherein the satellite receive antenna only receives the satellite broadcast signal comprised of television programming and commands from the satellite broadcast system, the satellite receive antenna is coupled to a single wire multiswitch and the satellite broadcast signal comprised of television programming is sent by the single wire multiswitch to at least one integrated receive decoder, and the integrated receive decoder decodes and separates the satellite broadcast signal comprised of television programming into viewer channels, which are then passed to a monitor for viewing by a user; and wherein the wireless device is separate from the integrated receive decoder and also coupled to the single wire multiswitch, the coaxial networking bridge enables the wireless device to receive both the satellite broadcast signal and the wireless broadband signal, and the coaxial networking bridge enables the satellite broadcast system to send the satellite broadcast signal comprised of commands to the wireless device that are interpreted by a controller in the wireless device, and the controller controls wireless network antenna of the wireless device based on the commands.

12. The wireless device of claim 11, wherein the wireless device is mounted with a satellite receive antenna.

13. The wireless device of claim 11, wherein the wireless device is controlled via the wireless network.

14. The wireless device of claim 11, wherein the wireless device is a relay device for at least one additional wireless device.

15. The wireless device of claim 11, wherein the increased capacity is provided by an increase in wireless system signal strength.

16. The wireless device of claim 11 wherein the increased capacity is provided by the change in modulation schema.

17. The wireless device of claim 11, wherein the increased capacity is provided by additional gain in the wireless network antenna.

* * * * *